US012638842B2

(12) United States Patent
Albrecht et al.

(10) Patent No.: US 12,638,842 B2
(45) Date of Patent: May 26, 2026

(54) PREDICTIVE MAINTENANCE FOR A DEVICE IN THE FOOD INDUSTRY BY MEANS OF A DIGITAL TWIN, AND OPTIMIZED PRODUCTION PLANNING

(71) Applicant: KRONES AG, Neutraubling (DE)

(72) Inventors: Thomas Albrecht, Beilngries (DE);
Lukas Schindler, Duggendorf (DE);
Benedikt Boettcher, Bruckmuehl (DE)

(73) Assignee: KRONES AG, Neutraubling (DE)

( * ) Notice: Subject to any disclaimer, the term of this patent is extended or adjusted under 35 U.S.C. 154(b) by 521 days.

(21) Appl. No.: 17/597,666

(22) PCT Filed: Jun. 9, 2020

(86) PCT No.: PCT/EP2020/065918
§ 371 (c)(1),
(2) Date: Jan. 17, 2022

(87) PCT Pub. No.: WO2021/008782
PCT Pub. Date: Jan. 21, 2021

(65) Prior Publication Data
US 2022/0269259 A1 Aug. 25, 2022

(30) Foreign Application Priority Data
Jul. 17, 2019 (DE) ..................... 10 2019 119 352.4

(51) Int. Cl.
*G05B 23/02* (2006.01)
*G06N 20/00* (2019.01)

(52) U.S. Cl.
CPC ......... *G05B 23/0283* (2013.01); *G06N 20/00* (2019.01)

(58) Field of Classification Search
CPC ..... G05B 23/0283; G06N 20/00; Y02P 90/30; Y02P 90/80; G06Q 10/0631; G06Q 50/04;
(Continued)

(56) References Cited

U.S. PATENT DOCUMENTS 9,811,074 B1 11/2017 Aichele et al.
2008/0172280 A1* 7/2008 Goulimis ............... G06Q 10/06
705/7.25
(Continued)

FOREIGN PATENT DOCUMENTS

DE 102013208082 A1 11/2014
DE 102015211344 A1 12/2016
(Continued)

OTHER PUBLICATIONS

Jaensch et al., "Digital Twins of Manufacturing Systems as a Base for Machine Learning," 2018 25th International Conference on Mechatronics and Machine Vision in Practice (M2VIP), Stuttgart, Germany, 2018, pp. 1-6, (Year: 2018).*
(Continued)

*Primary Examiner* — Eman A Alkafawi
*Assistant Examiner* — Dilara Sultana
(74) *Attorney, Agent, or Firm* — McCoy Russell LLP

(57) ABSTRACT

A method and system for automatically detecting a malfunction of a device in the food industry or the beverage industry, in particular for predictive maintenance. By means of a digital twin of the device, simulation data are produced for a plurality of malfunctions. Subsequently, a machine learning algorithm is trained on the basis of the simulation data and the plurality of malfunctions. The trained machine learning algorithm is then used to detect a malfunction of the device on the basis of operating data of the device. A method and system for determining an optimized production plan for
(Continued)

100 the production of one or more products by means of one or more production lines in the food industry or the beverage industry.

15 Claims, 9 Drawing Sheets

(58) Field of Classification Search
CPC .. G06Q 10/20; G06F 18/24155; G06F 18/214
See application file for complete search history.

(56) References Cited

U.S. PATENT DOCUMENTS

| | | | | |
|---|---|---|---|---|
| 2015/0212507 A1* | 7/2015 | Hahn | ................. | G05B 19/4188 |
| | | | | 700/86 |
| 2016/0364510 A1* | 12/2016 | Kashiwa | ................. | G05B 17/02 |
| 2017/0004429 A1* | 1/2017 | Maenishi | ........... | G05B 19/4188 |
| 2017/0185970 A1 | 6/2017 | Nakazato | | |
| 2017/0286572 A1* | 10/2017 | Hershey | ................... | B64F 5/60 |
| 2018/0137219 A1* | 5/2018 | Goldfarb | ................. | G06N 3/126 |
| 2018/0157244 A1* | 6/2018 | Weatherbee | ..... | G05B 19/41865 |
| 2018/0210436 A1* | 7/2018 | Burd | ................. | G05B 23/0294 |
| 2019/0086911 A1* | 3/2019 | Xin | ................... | G05B 13/0275 |
| 2019/0147413 A1* | 5/2019 | Johnson | ............... | G06Q 10/063 |
| | | | | 705/305 |

FOREIGN PATENT DOCUMENTS

| | | | |
|---|---|---|---|
| DE | 102016124083 A1 | 6/2018 | |
| EP | 2837984 A2 | 2/2015 | |
| EP | 2837984 A3 | 4/2015 | |
| EP | B428756 A1 | 1/2019 | |
| EP | 3454150 A1 | 3/2019 | |
| WO | WO-2018145947 A9 * | 10/2018 | ....... G05B 19/41865 |
| WO | 2019067630 A1 | 4/2019 | |

OTHER PUBLICATIONS

Rapolu, B., "Wie Künstliche Intelligenz (KI) die Bahnindustrie erobert—Bringing artificial intelligence (AI) to the rail Industry," Signal Und Draht: Signalling & Datacommunication, vol. 108, No. 8, May 10, 2016, 5 pages.

ISA European Patent Office, International Search Report Issued in Application No. PCT/EP2020/065918, Aug. 20, 2020, WIPO, 9 pages.

Novels, M. et al., "Scheduling With Simulation in the Food & Drinks Industry," Proceedings of the 1996 Winter Simulation Conference, Dec. 8, 1996, Coronado, California, 5 pages.

Allahverdi, A., "The third comprehensive survey on scheduling problems with setup times/costs," European Journal of Operational Research, vol. 246, No. 2, Oct. 16, 2015, 34 pages.

Zarandi, M. et al., "A state of the art review of intelligent scheduling," Artificial Intelligence Review, vol. 53, No. 1, Jan. 1, 2020, Available Online Nov. 19, 2018, 93 pages.

State Intellectual Property Office of the People's Republic of China, Office Action Issued in Application No. 202080051860.1, May 30, 2025, 14 pages. (Submitted with Machine Translation).

\* cited by examiner

500 real device

10A

20A

60 trained machine learning algorithm

70

600

610 generate simulation data by means of digital twin

620 train a machine learning algorithm on the simulation data

630 detect a malfunction based on operating data of the device

PREDICTIVE MAINTENANCE FOR A DEVICE IN THE FOOD INDUSTRY BY MEANS OF A DIGITAL TWIN, AND OPTIMIZED PRODUCTION PLANNING

CROSS REFERENCE TO RELATED APPLICATIONS

The present application is a U.S. National Phase of International Application No. PCT/EP2020/065918 entitled "PREDICTIVE MAINTENANCE FOR A DEVICE IN THE FOOD INDUSTRY BY MEANS OF A DIGITAL TWIN, AND OPTIMIZED PRODUCTION PLANNING," and filed on Jun. 9, 2020. International Application No. PCT/EP2020/065918 claims priority to German Patent Application No. 10 2019 119 352.4 filed on Jul. 17, 2019. The entire contents of each of the above-listed applications are hereby incorporated by reference for all purposes.

TECHNICAL FIELD

The disclosure relates to a method for automatically detecting a malfunction of a device in the food industry or the beverage industry, in particular for predictive maintenance, a system for automatically detecting a malfunction, a machine learning algorithm for automatically detecting a malfunction, a method for determining an optimized production plan, and a system for determining an optimized production plan.

BACKGROUND AND SUMMARY

Detection of an impending malfunction of a device is important in order to take timely maintenance actions (such as replacing a worn part or cleaning a component of the device) to prevent malfunction (such as bearing damage of the device). For example, it is often the case that the cause (such as reduced lubricity or increased friction) of the malfunction has been present for a period of time, but the malfunction does not occur until a later time. For example, a contaminated ball bearing of a device may continue to be used for a certain period of time before damage to the ball bearing and/or a stoppage of the device occurs. Therefore, it is important to detect the causative event (such as increased friction) leading to a future malfunction early on in order to prevent the malfunction from occurring. The detection of such a malfunction and the resulting timely implementation of maintenance measures is also known as predictive maintenance.

Currently, predictive maintenance techniques rely on human experience (such as the experience of a plant operator), on the basis of which predictive maintenance actions are performed. For example, an experienced operator recognizes that certain output signals from a device, such as temperature, or device motion patterns are unusual and determines a maintenance action for the device based on his or her experience.

Alternatively, it is possible to perform predictive maintenance based on operating data of a device (such as the output signals of the device's sensors). For this purpose, recorded operating data of previous malfunctions of the device are used to train a machine learning algorithm. This trained machine learning algorithm then receives current operating data of the device in real operation and may thus be used to detect a malfunction of the device.

In order to provide accurate detection for all (or approximately all) potentially possible malfunctions of the device, these malfunctions must have previously occurred on the device so that the appropriate operating data (corresponding to the particular malfunction) can be used in training the machine learning algorithm. If there is no (or little) operating data for a particular malfunction, the machine learning algorithm cannot be trained (or trained poorly) to recognize that particular malfunction.

Some malfunctions, however, occur very infrequently. Furthermore, malfunctions often result in damage to the affected equipment, and resolving a malfunction involves effort and expense. The deliberate induction of malfunctions in order to generate corresponding operating data (which may then be used for training the machine learning algorithm) is possible in principle, but also involves a great deal of effort and expense. This means that for precise detection of a malfunction, sufficient operating data for all possible malfunctions has to be recorded beforehand, but this operating data may only be generated with difficulty or at high cost.

Another disadvantage in the prior art is that many additional sensors (in addition to the sensors already present for the intended operation of the device) must be attached to the device in order to be able to precisely detect an impending malfunction. These additional sensors collect additional operating data that allow improvement of the detection of a malfunction despite the infrequent occurrence of some malfunctions.

While the operating data generated by the additional sensors improves the detection of malfunctions as described above, the additional operating data collected by the additional sensors must be transmitted, processed, and stored, which requires additional effort (for example, additional memory and computing power is required) and may result in a delay in the detection of the malfunction. In particular, this delay (caused by the additional operating data) may result in a loss of the timely response to the malfunction. In any case, this delay is undesirable, since measures preventing the malfunction can only be initiated after a delay.

Furthermore, the additional sensors may limit the function or application of the device and have to be applied in a costly manner. A further problem is to find suitable places for the attachment of the additional sensors to enable, for the recognition of an imminent malfunction, the sensors to receive as informative operating data as possible (which therefore allows a most precise recognition of a malfunction).

Object

It is thus the object of the disclosure to provide an improved method for predicting a malfunction for a device in the food or beverage industry, a corresponding system, and a corresponding trained machine learning algorithm, as well as an improved method for determining an optimized production plan and a corresponding system.

Solution

One embodiment of the disclosure relates to a method for automatically detecting a malfunction of a device in the food industry or the beverage industry, in particular for predictive maintenance. To this end, the method includes generating simulation data by means of a digital twin of the device, wherein the simulation data is generated for a plurality of malfunctions; training a machine learning algorithm based on the simulation data and the plurality of malfunctions to generate a trained machine learning algorithm; and detecting a malfunction of the device by the trained machine learning algorithm based on operating data from the device.

In this regard, the detected malfunction of the device may be an event, a failure, and/or a maintenance action to be taken. Specifically, the event may include increased friction, increased vibration, imbalance, a wear parameter, or decreased lubricity; the malfunction may include motor damage, bearing damage, axle breakage, crack, improperly positioned bottle, short circuit, or stopping of the device; and the maintenance action to be taken may include cleaning, lubricating, oiling, fastening, adjusting, dipping, or repairing.

Further, detecting the operational malfunction may further comprise detecting a component of the device, on which the malfunction occurs.

Moreover, detecting the malfunction may further comprise detecting an expected time period until a failure caused by the operational malfunction occurs.

By means of the method, a production plan or planning of a facility associated with the device may further be determined based on the expected time period and/or duration of a maintenance action to be taken for the detected malfunction.

The operating data may include output signals of the device, and the simulation data may include output signals of the digital twin. Each of the output signals of the digital twin may correspond to a respective output signal of the device.

Furthermore, each of the output signals of the device may be measured by a sensor of the device used in the intended operation of the device.

Additionally, the device operating data may include at least one additional output signal of the device, the additional output signal being measured by an additional sensor of the device that is not required in intended operation of the device. Accordingly, the simulation data may include at least one corresponding additional output signal of the digital twin. Moreover, the additional sensor of the device may be selected from a plurality of possible additional sensors by means of the digital twin such that the output signal of the additional sensor optimizes the detection of the malfunction.

According to the method described above, the trained machine learning algorithm for detecting the malfunction may determine a probability of each of the malfunctions based on the operating data of the device and detect one malfunction of the malfunctions as said malfunction when the probability of the malfunction reaches a threshold value.

Moreover, the machine learning algorithm may be additionally trained with recorded operating data of the device.

According to one embodiment, the device is a food industry tripod.

Another embodiment of the disclosure corresponds to a system for automatically detecting an operational malfunction of a device in the food industry or the beverage industry, in particular for predictive maintenance, which includes a digital twin of the device and a machine learning algorithm. The digital twin is configured to generate simulation data of the device, wherein the simulation data is generated for a plurality of malfunctions of the digital twin. The machine learning algorithm is trained on the basis of the simulation data and the malfunctions of the digital twin and is arranged to detect a malfunction of the device on the basis of operating data of the device. Further, the machine learning algorithm may be executed by a controller of the device, a processor connected to the device, or a cloud.

Another embodiment of the disclosure relates to a machine learning algorithm for automatically detecting a malfunction of a device in the food industry or the beverage industry, in particular for predictive maintenance, wherein the machine learning algorithm is trained on the basis of simulation data and malfunctions of a digital twin of the device, wherein the machine learning algorithm is arranged to detect a malfunction of the device on the basis of operating data of the device.

Another embodiment of the disclosure relates to a method for determining an optimized production plan for producing one or more products by means of one or more production lines in the food industry or the beverage industry. In a first step, the changeover time of the production plan is optimized. The changeover time includes a product change, bottle change, variety change, format change and/or pack change during the production of the products. When optimizing the changeover time, the production plan is broken down into a number of related units. Each of the units corresponds to at least one product, one processing step or at least one device of a production line for the production of a product of the production plan. Furthermore, when optimizing the changeover time, the units are arranged so that the changeover time has a minimum value. Thereafter, the production costs of the production plan that are to be spent for the processing of the units are optimized. Here, the production costs are determined by setup times and production times for the units by means of the devices, wherein the setup times and production times are defined depending on the product and the device. Optimizing production costs includes assigning the units to a respective production line and determining an order, in which the units are to be processed by the production lines.

Furthermore, the changeover duration and/or the production costs may additionally include a duration of a maintenance measure for a detected malfunction of a device of a production line, wherein the malfunction is detected by a machine learning algorithm trained on the basis of simulation data and malfunctions of a digital twin of the device or by the digital twin per se. In this case, the machine learning algorithm is arranged to detect the malfunction of the device on the basis of operating data of the device.

A further embodiment of the disclosure relates to a system arranged to perform the method described above for determining an optimized production plan.

BRIEF DESCRIPTION OF THE FIGURES

Embodiments according to the disclosure are described with reference to the following drawings. In the Figures.

DETAILED DESCRIPTION

Figure 1:
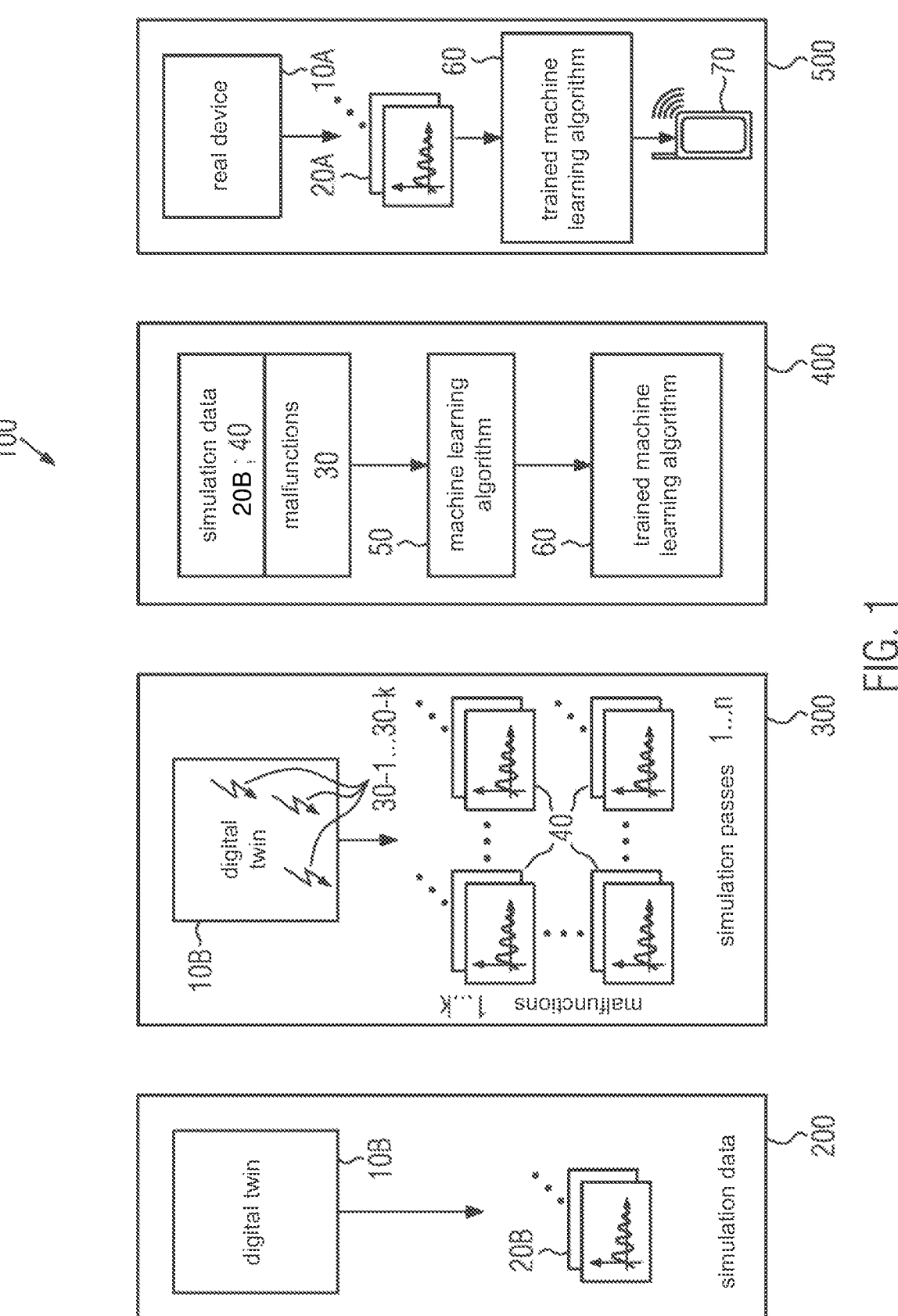
FIG. 1 shows an exemplary system for generating simulation data, training a machine learning algorithm and predicting a malfunction based on current operating data of the device.
Figure 2:
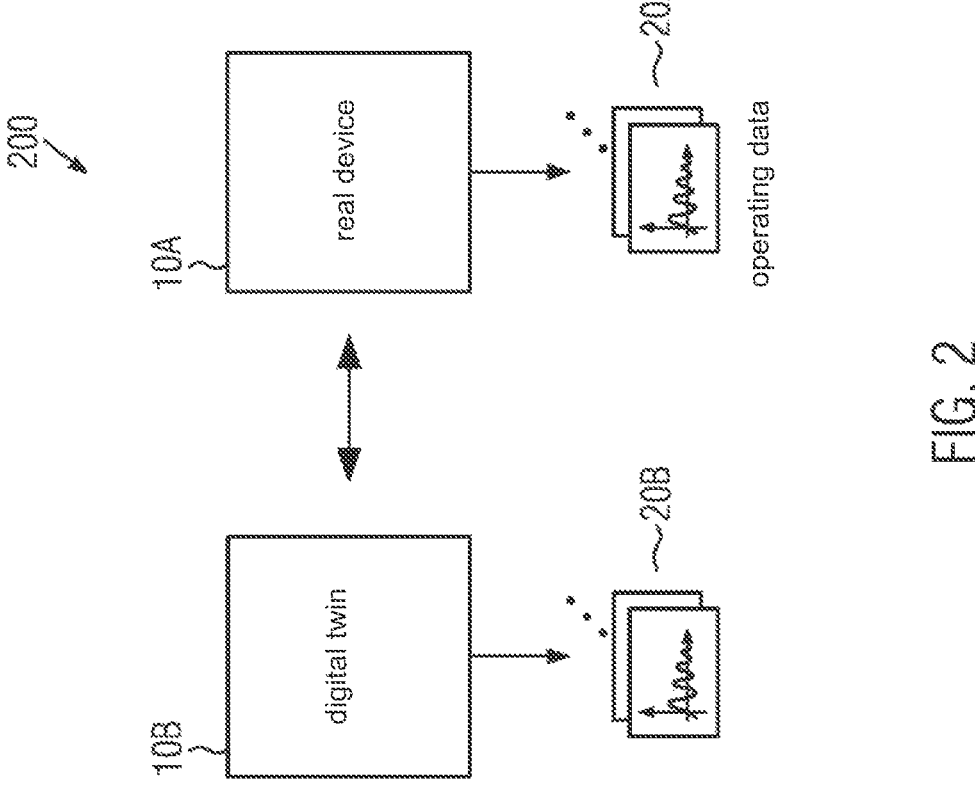
FIG. 2 shows a device generating operating data and a digital twin of the device generating simulation data for the device according to an exemplary embodiment of the disclosure.

FIG. 1 exemplarily shows a system 100 according to the present disclosure. The system 100 is exemplarily divided here into four components 200, 300, 400, 500. First, an overview is given with reference to FIG. 1, before the four exemplary components 200, 300, 400, 500 are described in more detail in connection with FIGS. 2-5.

According to the disclosure, a digital twin 10B of a (real) device 10A is created. This is exemplarily shown by component 200 and is described in more detail in connection with FIG. 2. This digital twin 10B has the same physical properties as the real device 10A. Thus, the digital twin 10B provides simulation data 20B that corresponds one-to-one to the operating data 20A of the device 10A.

According to the disclosure, this digital twin 10B is used to generate simulation data 40 for possible malfunctions 30. This is exemplified by component 300 and is described in more detail in connection with FIGS. 3A and 3B. This simulation data 40 of the digital twin 10B corresponds one-to-one to the operating data 20A of the real device. According to the disclosure, instead of causing a malfunction in the real device 10A, the malfunction 30 is simulated by means of the digital twin 10B so as to obtain simulation data 40 corresponding one-to-one to the operating data of the device 10A as obtained in the presence of a malfunction. A malfunction 30 represents, on the one hand, events which do not themselves constitute a direct malfunction, but which may lead to a future malfunction if no maintenance measures are taken, such as increased friction (e.g., due to contamination), increased vibration, an imbalance, a wear parameter, or a reduced lubricating effect. On the other hand, it also refers to failures that may occur as a result of this event, such as a motor failure, a bearing failure, an axle failure, a crack, an incorrectly positioned bottle, a short circuit, or a device stop (for example, because a critical value has been exceeded that causes the device to stop).

Thus, a variety of malfunctions 30 may be defined for the digital twin 10B, which may be based on, for example, experience, malfunctions that have already occurred, or randomly generated malfunctions. These malfunctions may also be defined and simulated for different components of the digital twin (such as a bearing, a chain, a gear, a motor, etc.). Subsequently, simulation of these malfunctions 30 is performed while using the digital twin 10B, and a plurality of simulation data 40 may be generated for each of the malfunctions 30. The simulation data thus generated may then be used to train a machine learning algorithm 50 (such as a classifier).

Based on the malfunctions 30 and the simulation data 40 from the digital twin 10B, the machine learning algorithm 50 may then be trained to produce a trained machine learning algorithm 60. The training of the machine learning algorithm

50 is performed such that the trained machine learning algorithm 60 is able, based on the simulation data 40 of a particular malfunction 30, to recognize that malfunction. This is exemplified by component 400 and is described in more detail in connection with FIG. 4. The disclosure enables simulation data 40 for training the machine learning algorithm 50 to be generated which, having been generated by the digital twin 10B of the real device 10A, corresponds one-to-one to the operating data of the real device 10A. In this regard, according to the present disclosure, it is no longer necessary to induce malfunctions of the real device 10A in order to generate corresponding operating data for the malfunctions, but simulation data 40 is generated for malfunctions 30 that are simulated on the digital twin 10B. Thus, it is possible to generate a plurality of training data (namely, the simulation data 40) for a plurality of corresponding malfunctions 30 (i.e., even for those malfunctions that rarely occur during the operation of the real device).

The machine learning algorithm 60 trained on the simulation data 40 of the digital twin 10B is then used to predict a malfunction of the (real) device 10A on the basis of current operating data 20A of the real device 10A. This is exemplified by component 500 and is described in more detail in connection with FIG. 5. For this purpose, the trained machine learning algorithm 60 may, for example, be translated into a general executable code and ported to the controller of the (real) device 10A or an additional industrial PC (IPC). It is also possible to apply the trained machine learning algorithm 60 in a cloud. During the operation of the (real) device 10A, the output signals of the (real) device 10A are then continuously provided to the trained machine learning algorithm 60. The trained learning algorithm 60 then automatically determines (based on its trained knowledge and the output signals of the device 10A) the current state of the device 10A and whether a malfunction exists and/or is imminent. Further, the machine learning algorithm 60 may identify what the malfunction is (which may be used to initiate appropriate maintenance actions to correct the malfunction and avoid the occurrence of a fault/damage), which component of the device is experiencing the malfunction, and how long it will take before a malfunction occurs if maintenance actions are not performed. For example, in addition to detecting that there is increased friction in a certain bearing, it is possible to determine how long the device will be able to continue to operate before the bearing fails, trigger the ordering of a new bearing, and/or notify a service technician.

In certain embodiments, no (or only a few) additional sensors need to be attached to the device 10A, which (as described above) are used in the prior art to obtain additional operating data of the device to enable more precise detection of a malfunction. In this context, an additional sensor is to represent here a sensor that is not already present in the device 10A for other reasons (not directly related to predictive maintenance), such as, for example, for the reason that it is necessary for the intended operation of the device, and is used to improve predictive maintenance. A sensor that is already present in the device 10A anyway (and is used for the intended operation of the device) is hereinafter referred to as an operational sensor.

In accordance with the present disclosure, it is possible to dispense with (or reduce the number of) additional sensors because the digital twin 10B is configured to generate a plurality of simulation data 40 for all possible malfunctions 30, thereby eliminating the need for the additional operating data from additional sensors when training the machine learning algorithm 50. In particular, this is possible because the digital twin 10B generates the same output signals (in the form of simulation data 20B) that are measured in the real device 10A (in the form of operating data 20A). That is, the digital twin 10B has the same operational sensors as the (real) device 10A and thus provides simulated output signals that correspond to the real operating data 20A of the real device 10A, in particular the real operating data provided by the operational sensors that are generated anyway in the operation of the device 10A. In other words, the digital twin 10B generates (for a plurality of malfunctions 30) a plurality of simulation data 40 corresponding to the operating data 20A of the operational sensors of the real device 10A. With this simulation data 40 (i.e., the simulated output signals of the operational sensors of the digital twin corresponding to the real output signals of the operational sensors of the real device), it is possible to precisely train the machine learning algorithm 50. Therefore, it is not necessary to attach a plurality of additional sensors to the real device 10A or to perform experiments or monitor real operational faults.

Furthermore, by using the digital twin 10B in the event that an additional sensor is to be used, it is possible to select this additional sensor as optimally as possible. For example, the type of additional sensor (e.g., a vibration, voltage, or torque sensor) and the location of the sensor on the device 10A may be determined by using the digital twin 10B in a manner that optimally improves the detection of a malfunction by a trained machine learning algorithm 60. To this end, one or more additional sensors may be added to the digital twin 10B and simulation data 40 may be generated for the operational sensors and the one or more additional sensors. Then, based only on the simulation data of the operational sensors a machine learning algorithm 50 is trained, and the same machine learning algorithm 50 is trained on the basis of the simulation data of the operational sensors and the one or more additional sensors. Thereafter, it may be determined whether the trained machine learning algorithm 60-2 that was additionally trained on the basis of the simulation data of the one or more additional sensors is better (e.g., earlier or more likely) at predicting a malfunction than the trained machine learning algorithm 60-1 that was trained based only on the simulation data of the operational sensors. This process may be repeated with one or more other additional sensors on the digital twin 10B, and a plurality of trained machine learning algorithms 60-1 . . . 60-L may be generated using the respective simulation data. Finally, the influence of different additional sensors on the precision of the trained machine learning algorithms 60-1 to 60-L for detecting a malfunction may be compared. Then the additional sensor (or sensors) may be selected, based on whose simulation data a trained machine learning algorithm with the best precision was generated. This sensor, determined using the digital twin 10B, may then be attached to the real device 10A and used for predictive maintenance of the real device.

FIG. 1 shows an embodiment of the present disclosure for a device 10A in the food industry, in particular the beverage industry. In one example, the device 10A is a food industry tripod as known from DE 10 2013 208 082 A1. In operation, the device 10A generates operating data 20A, such as the time history of the output signals of the device 10A. Typically, the output signals include one or more of a torque, a velocity, an acceleration, a current, a voltage, a temperature, and a vibration measured by corresponding sensors of the device 10A. It is the object of the disclosure to automatically detect, based on the operating data 20A of the device 10A, if (and/or when) the device requires maintenance to avert a malfunction. Typical maintenance tasks include, for example, cleaning individual components of the device, replacing worn parts, lubricating bearings, etc. The detection of a malfunction and the resulting timely performance of maintenance measures is also known as predictive maintenance.

According to one embodiment of the disclosure, in particular there is the possibility to predict a malfunction based only on the operating data of operational sensors of the device (i.e., sensors that are used and available for the operation of the device anyway) or based on the operating data of the operational sensors and only a few selected additional sensors (that are specifically used for predictive maintenance).

According to the disclosure, a digital twin 10B of the device 10A is generated for this purpose. In this case, the digital twin 10B is a digital representative of the (real) device 10A, which replicates the real device 10A in a computer-executable component. The generation of a digital twin is known in the prior art. The digital twin 10B of the device 10A may then be used to simulate any processes performed by the (real) device 10A. For example, the digital twin 10B may be used to simulate the timing of the translational and rotational motion of the device 10A, as well as the control signals used for this purpose and the output signals generated by the device 10A in the process. The digital twin 10B may thus generate simulation data 20B corresponding to the operating data 20A of the real device 10A. That is, while a process is being simulated at the digital twin 10B, the digital twin 10B may generate simulation data 20B of the temporal output signals (such as one or more of a torque, a velocity, an acceleration, a current, a voltage, a temperature, and a vibration) measured by (simulated) sensors of the digital twin 10B. This simulation data 20B corresponds to the operating data 20A that the device 10A would output if the same process (simulated by means of the digital twin 10B and resulting in the simulation data 20B of the digital twin 10B) were performed on the real device 10A. In particular, this simulation data 20B corresponds to the temporal output signals (such as one or more of a torque, a velocity, an acceleration, a current, a voltage, a temperature, and a vibration) that would be measured by the (real) sensors of the device 10A when performing the same process.

Figure 3A:
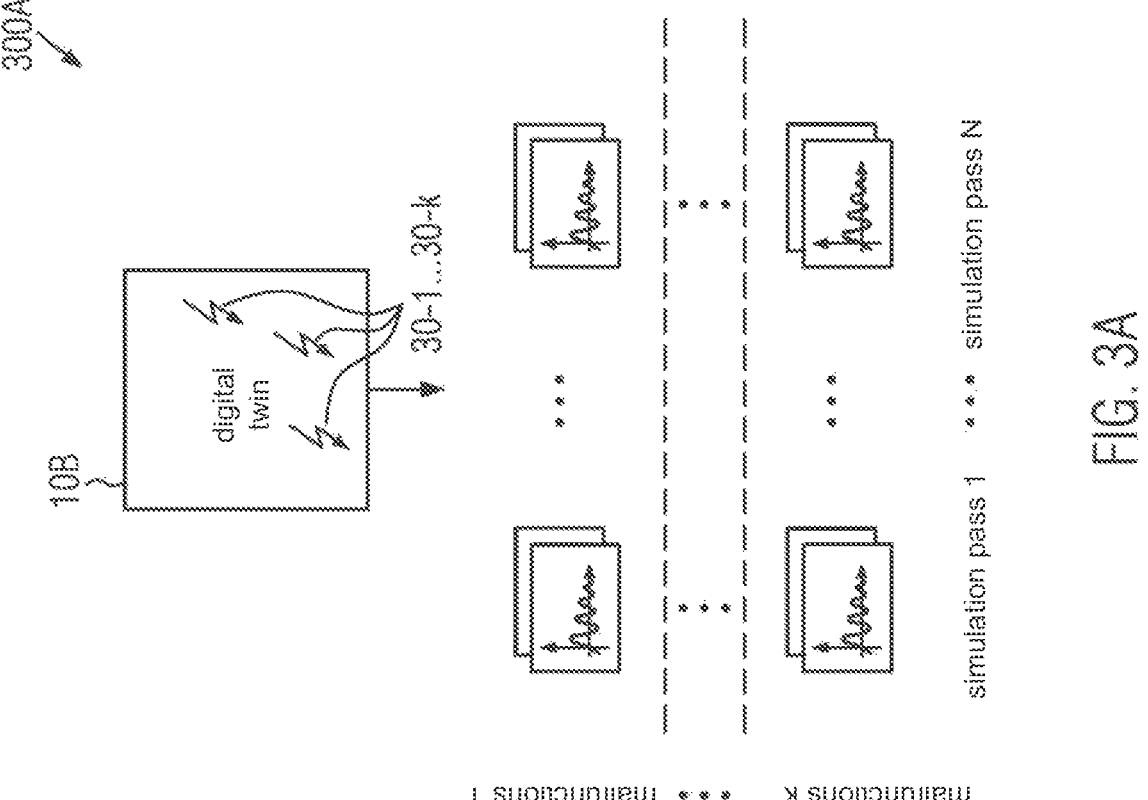
FIG. 3A shows a digital twin of a device that generates simulation data for a plurality of malfunctions and for a plurality of simulation runs in each case, in accordance with an exemplary embodiment of the disclosure.

As described above, it is a problem in the prior art that typically too small a body of operating data 20A is available for detecting a malfunction of the device 10A and the potential malfunction or operating data may only be generated under high stress. According to the disclosure, malfunctions of the device 10A are simulated by the digital twin 10B, which enables the generation of a plurality of simulation data 40 for a plurality of malfunctions 30. This is shown in FIG. 3A, in which, as an example, K malfunctions 30-1, 30-2 . . . 30-K of the digital twin 10B are illustrated. Each of these K malfunctions may be a damage class or correspond to a damage class that may be predefined at the digital twin 10B. The digital twin 10B may perform a plurality (N) of simulation runs for each of the K malfunctions. In doing so, the digital twin 10B may generate simulation data 40-1-1 . . . 40-K-N for each of the N simulation runs, each of which reflects the time history of the M output signals of the digital twin 10B. In other words, N simulation passes are performed for each of K malfunctions, each of which includes M output signals. Thus, K×N×M time histories of individual output signals may be generated (where K, N and M are integers). In order to have a comparison with normal operation (i.e., operation without a malfunction), simulation data 20B of the digital twin 10B without a malfunctions may also be generated.

A malfunction is to represent here, on the one hand, events which do not yet constitute a malfunction themselves, but which may lead to a future malfunction (if no maintenance measures are taken), such as, for example, contamination, wear, imbalances and/or increased friction, and, on the other hand, also the malfunctions themselves which may occur as a consequence of this event, such as, for example, motor damage, bearing damage, crack in a component, incorrectly placed bottles or also the stopping of the device (e.g., as a result of exceeding a critical value leading to an (emergency) stop of the device). The previously described malfunctions 30-1, 30-2 . . . 30-K may be a damage class and/or may be defined as damage classes at the digital twin 10B and may be simulated by means of the digital twin 10B. For example, different classes of friction in one (or more) component(s) may be simulated using different friction coefficients as different malfunctions, respectively.

Potential events leading to a malfunction for the food industry tripod exemplified above include, for example, increased friction in a joint, decreased lubricity in a prismatic universal joint, or increased friction between the container and mat chain due to contamination. Potential malfunctions that may occur in the food industry tripod exemplified above include, but are not limited to, bearing failure in a joint, loosening of the connection between the pack and mat chain, and motor failure.

As described above, N simulation passes of the digital twin 10B may be performed for each of the K malfunctions or classes of damage (and, for example, even in the case where there is no malfunction) to generate N different simulation data for each malfunction. For this purpose, N simulation runs of the digital twin may be performed in each case, each of which is subject to the same malfunction, but which nevertheless differ from one another. N is any natural number greater than 1, in some aspects greater than 100. For example, random starting conditions may be selected for the simulation of the malfunction, or the parameters describing the malfunction (such as the friction coefficient) may be varied slightly. Furthermore, it is possible to subject the simulation runs to stochastic variations, which leads to the fact that the individual simulation runs differ from each other despite the same (or very similar) malfunction. A simulation may then either be stopped after a predetermined time has elapsed or may be stopped when a specific event occurs (in particular, the malfunction associated with an event). In this way, simulation data 40-1-1 . . . 40-K-N may be generated for each of the K malfunctions 30-1, 30-2 . . . 30-K. It has been described above that simulation data N are generated for each malfunction; however, this does not mean that exactly the same number of simulation data has to be available for each malfunction 30-1, 30-2 . . . 30-K. It is of course also possible that less or more than N simulation data are generated for one or also more of the malfunctions 30-1, 30-2 . . . 30-K.

Thus, any number of simulation data 40-1-1 . . . 40-K-N may be generated for all possible malfunctions by the digital twin 10B of the device 10A. This solves the problem described above in the prior art that for some malfunctions only a few recorded operating data 20A of the device 10A are available or these may only be generated with great effort.

Figure 3B:
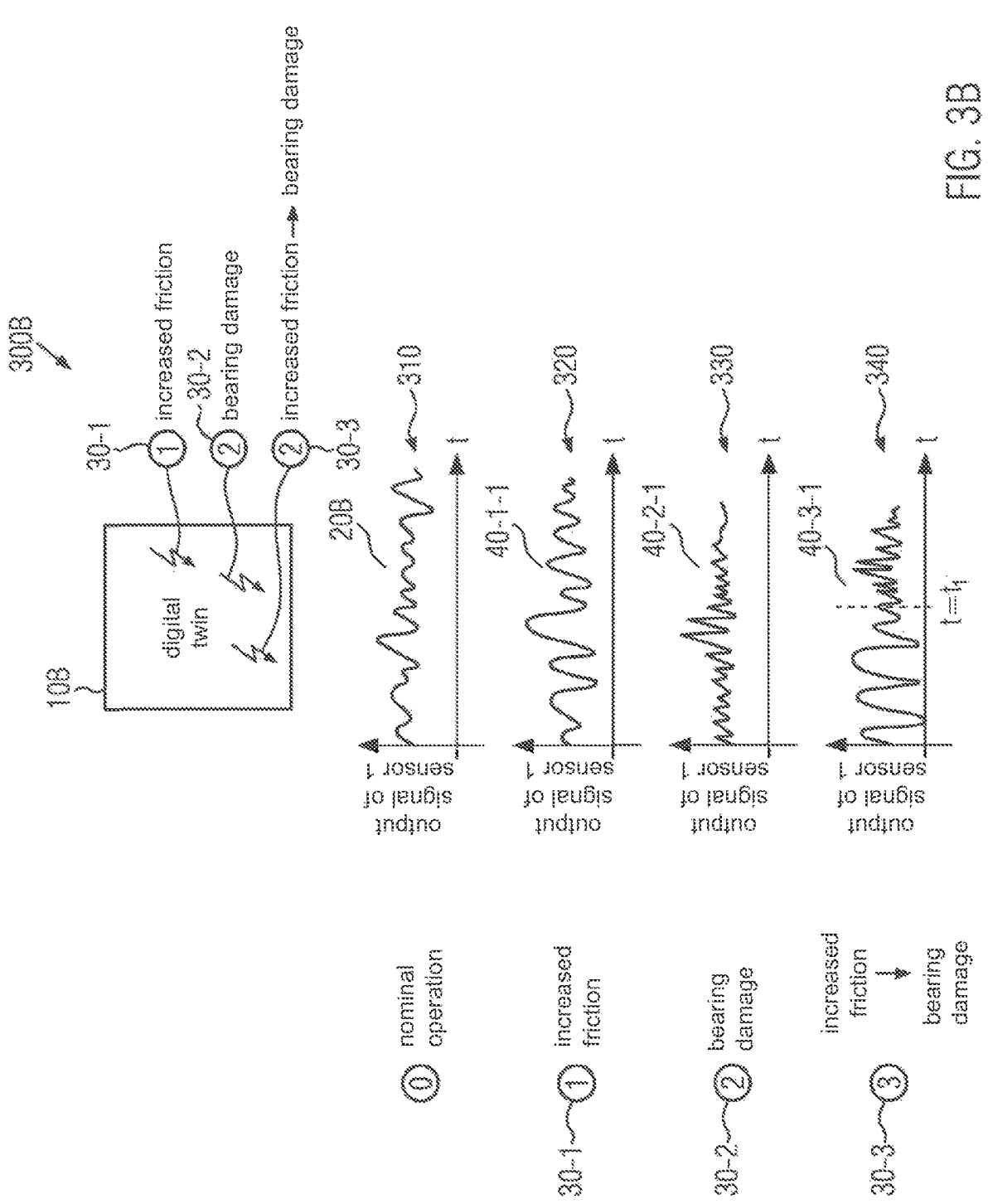
FIG. 3B shows illustrative simulation data of the digital twin for normal operation and various malfunctions.

With reference to FIG. 3B, in the following there is shown an example of generating simulation data for a single one of the M output signals (e.g., for sensor 1 of the M sensors) for a single simulation run of the digital twin 10B for no malfunction 310 and for three exemplary malfunctions 320, 330, 340. As mentioned above, usually N simulation runs are performed for each of K malfunctions, each with M output signals. The example of one simulation run and one output signal described on the basis of FIG. 3B may be extended to this general case without further ado.

Diagram 310 shows the simulated output signal of a sensor (in this example: sensor 1) for a simulation run of the digital twin 10B for the case where there is no malfunction. Furthermore, diagrams 320, 330, and 340 show the simulated output signal of a sensor (in this example: sensor 1) for a simulation run of digital twin 10B for the case where various malfunctions 30-1, 30-2, and 30-3 are present. In order to simulate a malfunction, different components of the digital twin 10B may be selected at the digital twin 10B (such as a particular bearing, axle, motor, etc.) and different types of malfunctions (such as, for example, increased friction, imbalance, etc.) may be simulated for each of the selected components. In diagrams 320, 330, and 340, a particular bearing is selected as a component of the digital twin, by way of example. Furthermore, three different malfunctions 30-1, 30-2 and 30-3 are simulated for this component as an example. Diagram 320 shows, by way of example, a malfunction 30-1 representing an event (in the sense described above), in this case an increased friction in the selected bearing. As described above, an event represents a malfunction that may be corrected by a maintenance action, but which, if not corrected, may lead to a failure, such as damage to the device. In the example shown here, the malfunction corresponding to increased friction in the selected bearing is simulated for a certain time by means of the digital twin 10B and generates the simulation data 40-1-1 (exemplified here for sensor 1). Diagram 330 shows an example of a malfunction 30-2 that represents a malfunction (in the sense described above), in this case damage to the selected bearing. In the example shown here, the malfunction corresponding to damage of the selected bearing is simulated for a certain time by means of the digital twin 10B and generates the simulation data 40-2-1 (exemplified here for sensor 1). Furthermore, the diagram 340 exemplifies a malfunction 30-3 that includes both an event ("increased friction") and a malfunction or failure ("bearing damage"), the malfunction being caused by the event. As shown in diagram 340, in this case, an event is initially simulated and a fault occurs during the simulation of the event. Typically, the incident may occur after a certain time ($t=t_1$). In this way, a plurality of malfunctions may be defined (e.g., by selecting a type of malfunction and a location of the malfunction), each of which may provide simulation data for M sensors and N simulation runs by means of the digital twin 10B.

As described above, for each simulation run, the digital twin 10B may be used to simulate the time progressions of the translational and rotational motions of the device 10A, as well as its input, control, and output signals. The time progressions of the M output signals of the digital twin 10B may then be used as simulation data 20B, 40-1-1, . . . 40-K-N. The digital twin 10B has the same physical characteristics as the (real) device 10A and provides the same M output signals (i.e., the operating data 20A) as the device 10A. That is, the simulation data 40-1-1 . . . 40-K-N generated for the K malfunctions by means of the digital twin 10B correspond to the operating data 20A that the device 10A would output if it were subject to the respective malfunction. Thus, simulation data of the digital twin 10B corresponding to the operating data of the real device 10A may be generated for each of the K malfunctions 30-1 . . . 30-K.

This simulation data of the digital twin 10B (corresponding to the operating data of the device 10A) may then be used to train a machine learning algorithm 50, such as a classifier. In doing so, the machine learning algorithm 50 learns characteristic features that appear in the simulation data 20B, 40-1-1 . . . 40-K-N of the simulated malfunction 30-1 . . . 30-K of the digital twin 10B. Subsequently, a machine learning algorithm 60 trained in this way may also find these characteristic features in the operating data 20A of the real device 10A and thus detect a malfunction of the real device 10A. This enables the detection of not only whether a malfunction is present, but also which malfunction is present, on which component it is present, and/or how much time remains to perform a maintenance action before damage or a failure occurs.

The previously described malfunctions 30-1, 30-2 . . . 30-K defined for the digital twin 10B may then also be detected on the real device 10A by means of a trained machine learning algorithm, as described in more detail below. In particular, it is possible for the trained machine learning algorithm to recognize both the type and location of the malfunction, as a malfunction defined for the digital twin 10B may include both a type of malfunction (e.g., an event such as increased friction) and a location of the malfunction (e.g., at which component of the digital twin 10B the malfunction occurs). For example, if the malfunction of the digital twin is "increased friction in bearing X", the trained machine learning algorithm that is based on the operating data of the device may recognize these two pieces of information, i.e., the type of malfunction ("increased friction") and the location of the malfunction ("bearing X").

Furthermore, it is possible to determine an expected time until the occurrence of a malfunction related to an event (such as the bearing damage caused by increased friction in 340). According to one embodiment, this time period may be determined directly based on the simulation data. For example, one possibility is to average the time period $t_1$ (in diagram 340) until the malfunction associated with the event occurs over all N simulation runs for that event. If the trained machine learning algorithm 60 then detects this event based on the operating data of the device 10A, the average value thus formed may be output as additional information (in addition to the type and location of the event). In the example described in diagram 340, a corresponding notification could be "Increased friction in bearing X, expected time until bearing damage occurs: $t_1$". In an alternative embodiment, the machine learning algorithm could also be trained to predict the expected time span until a failure occurs. The term time span here may indicate a specific amount of time (such as 24 hours left) or a number of units still to be produced (such as 1000 production units left) until the incident associated with the event occurs.

Figure 4:
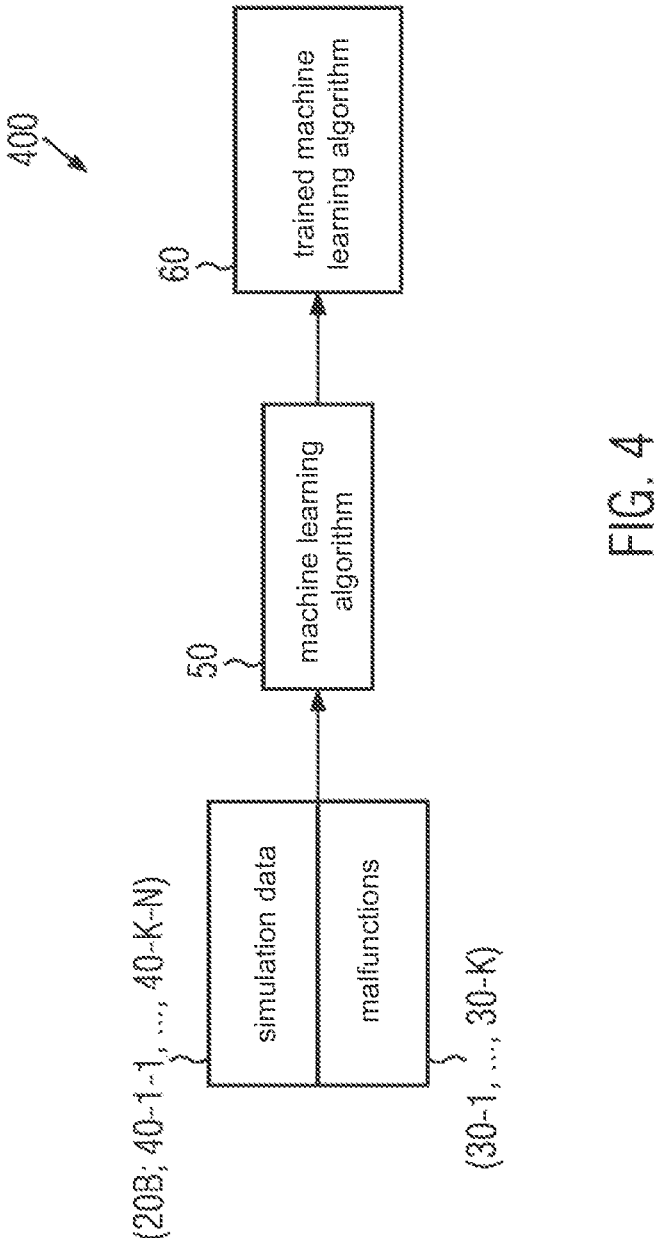
FIG. 4 shows the generating of a trained machine learning algorithm based on the simulation data and the associated malfunctions according to an exemplary embodiment of the disclosure.

FIG. 4 shows an example of training a machine learning algorithm 50 on the basis of simulation data 20B, 40-1-1 . . . 40-K-N and malfunctions 30-1 . . . 30-K of the digital twin 10B. The machine learning algorithm 50 may be any suitable machine learning algorithm known in the prior art, such as a classifier or a regression method. Well-known examples include neural networks, support vector machines, boosting, naive Bayes, etc.

During training, the malfunctions 30-1 . . . 30-K (and presence of no malfunction) or the damage classes may be used as ground truth and the simulation data 20B, 40-1-1 . . . 40-K-N as corresponding training data. The training determines the parameters of the machine learning algorithm 50 with which the trained machine learning algorithm 60 may optimally recognize the respective ground truth (e.g., whether one and, if so, which of the malfunctions 30-1 . . . 30-K corresponding to the respective simulation data 20B, 40-1-1 . . . 40-K-N is present) based on the training data (i.e., the simulation data 20B, 40-1-1, . . . 40-K-N). The machine learning algorithm 50 with the optimal parameters thus determined is the trained machine learning algorithm 60. Training of machine learning algorithms (e.g., by dividing the training data into a test set and a training set, optimizing an error term, and using cross-validation) is known in the prior art. The trained machine learning algorithm 60 is then able, given a data set of the simulation data (e.g., 40-2-1), to accurately predict the malfunction that was present when that data set was simulated (for 40-2-1, this is malfunction 30-2).

Additional or alternative learning objective (ground truth) of the machine learning algorithm may also be a predicted time until a malfunction occurs. Furthermore, multiple malfunctions or classes of damage (such as multiple classes of increased friction) may be grouped together so that the trained machine learning algorithm recognizes only the grouped malfunction (for example, only increased friction and not how intensive the increased friction is in any particular case). Another option is to output the maintenance action for the detected malfunction instead of, or in addition to, the learning objectives (ground truth) discussed above.

In one embodiment of the disclosure, in addition to the simulation data 20B, 40-1-1, . . . 40-K-N of the digital twin 10B, historical operating data of the device 10A may also be used for training the machine learning algorithm. If there is historical operating data for malfunctions that is equal to one of the simulated malfunctions 30-1 . . . 30-K, this historical operating data may be added to the simulation data for this malfunction and the machine learning algorithm 50 may be trained on the basis of the simulation data 20B, 40-1-1 . . . 40-K-N and the historical operating data for this malfunction. Furthermore, it is possible to define additional malfunctions or damage classes that cannot be simulated with the digital twin 10B. An example of this is the intervention of an operator of the device 10A, for example, where the operator takes control of the device 10A (e.g., by overriding the automatic control of the device). This is the case, for example, when the operator determines, based on the operator's experience, that there is an irregularity in the operation of the device 10A. An intervention by an operator of the device may thus be defined as a new malfunction (e.g., 30-K+1) and the operating data recorded prior to the occurrence of the intervention may be used as historical operating data for training the machine learning algorithm 50. Further, in the event that there is no malfunction, instead of (or in addition to) simulation data 20B (generated for normal operation without malfunction using the digital twin 10B), historical operating data of the device 10A recorded when there was no malfunction may also be used for training the machine learning algorithm 50.

Figure 5:
FIG. 5 shows the detection of a malfunction of a device by a machine learning algorithm trained on simulation data of the digital twin on the basis of current operating data of the device according to an exemplary embodiment of the disclosure.
Figure 5:
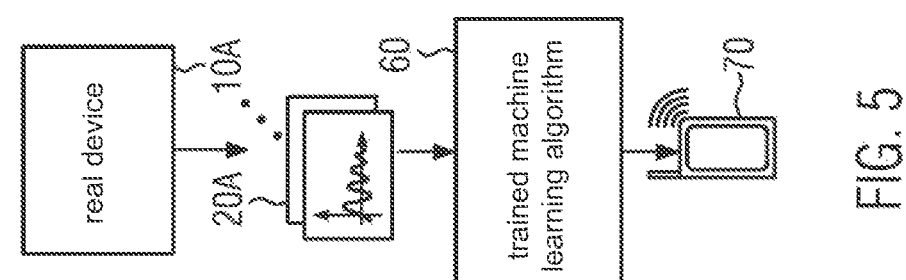

The machine learning algorithm 60 described above, trained using the digital twin 10B, is then used in accordance with the disclosure to detect a malfunction of the (real) device 10A, as exemplified in FIG. 5. For this purpose, the (current) operating data 20A of the device 10A is provided to the trained machine learning algorithm 60, which may detect a malfunction of the device 10A based on the operating data 20A. In particular, the trained machine learning algorithm is adapted to identify which malfunction is present (e.g., an event such as increased friction), where that malfunction is present (e.g., increased friction in universal joint), and/or determine an expected time period after which a failure will occur (e.g., damage to universal joint in 12 hours). According to one embodiment of the disclosure, based on the current operating data 10A, the machine learning algorithm determines for each of the malfunctions (and also for no malfunction) a probability $P\_k$ (where $k=0$ for no malfunction, and $k=1 \ldots . K$ for the malfunctions $30\text{-}1 \ldots 30\text{-}K$) indicating how likely the malfunction $k$ is to be imminent. If the trained machine learning algorithm determines a probability $P\_k$ for a malfunction $k$ that is greater than a threshold value $P\_G$, a notification 70 may be generated indicating a malfunction. The notification 70 may include, for example, the detected malfunction $k$ (e.g., the location at the device and the type of malfunction) and/or an estimated amount of time (e.g., how many hours remain or how many product units may still be produced) until a failure of the device 10A associated with the malfunction occurs. Further, the notification may also include a maintenance action to be performed to correct the malfunction and/or a duration of that maintenance action. For example, the notification 70 may be sent to an operator of the device and/or maintenance personnel. The trained machine learning algorithm 60 may be ported to the controller of the device 10A or an additional industrial personal computer (IPC). Alternatively, it is also possible to apply the trained machine learning algorithm 60 in a cloud.

As described previously, the trained machine learning algorithm 60 trained on the simulation data 20B, 40-1-1, . . . 40-K-N of the digital twin 10B is capable of detecting a malfunction of the device 10A. In some embodiments, the malfunctions (and possibly associated failures) do not have to occur on the real device 10A (in order to obtain the operating data associated with the malfunction for training the machine learning algorithm), but may be simulated using the digital twin.

Additionally, it is possible to generate a plurality of simulation data for each of the malfunctions 30-1 . . . 30-K, which improves the precision of the trained machine learning algorithm in detecting a malfunction. This also enables the reduction of the number of additional sensors, as used in the prior art to improve predictive maintenance, or to dispense with additional sensors altogether.

According to a further embodiment of the disclosure, the digital twin 10B is used to determine one (or more) additional sensor(s) that optimally improves predictive maintenance of a malfunction (according to the present disclosure). To this end, various additional sensors (such as, for example, a vibration, current, torque, temperature, or acceleration sensor) may be added to the digital twin 10B at various locations. The influence of these additional sensors on the detection of a malfunction (as described above) may then be compared, and among the additional sensors, one or more may be selected that optimally improve the prediction of the malfunction. These selected sensors of the digital twin 10B may then also be attached to the (real) device 10A to improve the detection of a malfunction of the device 10A. In other words, various additional sensors may be simulated by means of the digital twin 10B and compared with respect to their information content for detecting the malfunctions 30-1 . . . 30-K simulated on the digital twin. In this way, different sensors such as, for example, a vibration, current, torque, temperature, or acceleration sensor may be applied to different locations of the digital twin 10B (which is a one-to-one image of the device 10A) and tested (by means of simulation by the digital twin) as to which sensor at which location of the device provides an output signal that optimally improves the precision of the machine learning algorithm trained on this simulation data (compared to other additional sensors of the digital twin and compared to using no additional sensors).

For example, if $Z$ additional sensors are added (at $Z$ locations of the digital twin) and the digital twin has $X$ operational sensors (i.e., sensors that are already present and are not additional sensors), then the digital twin provides $Z+X$ output signals as simulation data for each simulation run. The digital twin (with the $Z$ additional sensors) may now be simulated as described in connection with FIG. 3 for the $K$ malfunctions 30-1 . . . 30-K with $N$ simulation runs each. This provides simulation data similar to the above with $K \times N \times (X+Z)$ individual output signals. Subsequently, $Z+1$ different trained machine learning algorithms may be generated by training a machine learning algorithm on the simulation data without the output signals of the additional sensors and by training a machine learning algorithm for each of the $Z$ additional sensors with the respective output signal of one of the $Z$ additional sensors. Subsequently, the precision (such as the optimized error term of the trained machine learning algorithm or the Bayesian information criterion) of the $Z+1$ trained machine learning algorithms may be compared. The additional sensor that resulted in the trained machine learning algorithm with the best precision (e.g., the lowest error term) (or the $n$ additional sensors that resulted in the $n$ best trained learning algorithms) may then be selected, and the same sensor may then also be placed at the same location (as on the digital twin) on the real device and used to detect a malfunction of the device according to the disclosure.

Figure 6:
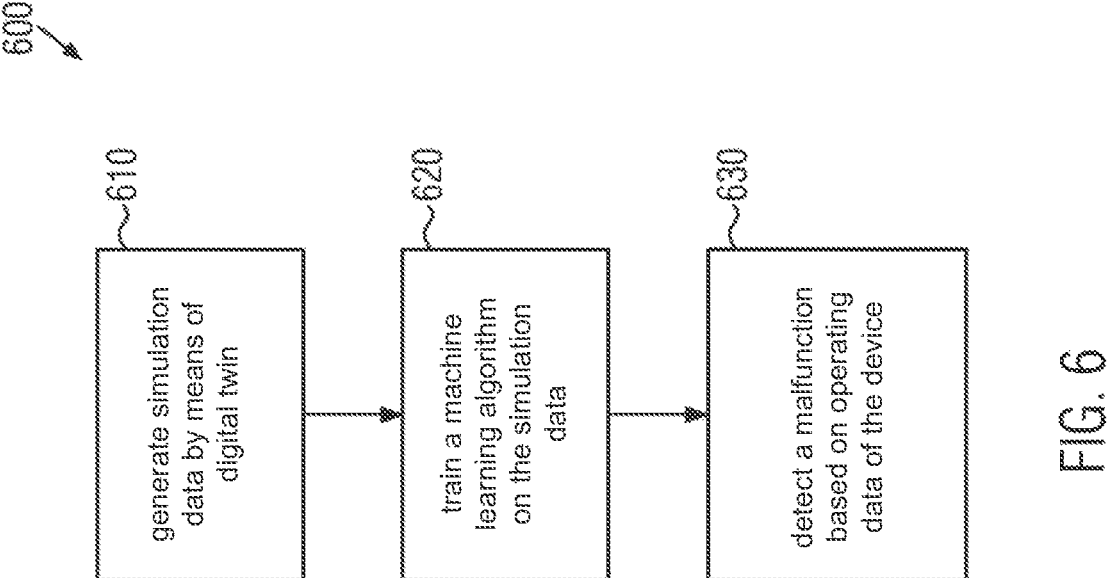
FIG. 6 shows a predictive maintenance method according to the disclosure.

FIG. 6 shows a method 600 according to the disclosure for automatically detecting a malfunction of a device (10A) in the food or beverage industry, in particular for predictive maintenance. In a first step 610, simulation data 20B, 40-1-1, 40-2-1 . . . , 40-K-N are generated by means of the digital twin 10B of the device 10A. In this step, the simulation data is generated for a plurality of malfunctions 30-1-1, 30-2-1 . . . 30-K-N of the digital twin 10B. In a second step 620, the machine learning algorithm 50 is trained on the basis of the simulation data 20B, 40-1-1, 40-2-1 . . . 40-K-N of the digital twin 10B and the plurality of simulated malfunctions 30-1-1, 30-2-1 . . . 30-K-N to generate a trained machine learning algorithm 60. This trained machine learning algorithm 60 is then used in step 630 to detect the malfunction of the (real) device 10A on the basis of the operating data 20A of the (real) device.

According to a further embodiment of the disclosure (which may be combined with any of the features described above), predicting a malfunction may also be used to optimize the production plan of a plant having one or more production lines (e.g., the food industry and, in particular, the beverage industry). In this case, the information that a maintenance action for a device of a line of the plant is imminent, which maintenance action is imminent (i.e. how long the maintenance action will take) and/or in which time window the maintenance action has to be performed (i.e. how much time remains or how many products may still be produced before the maintenance action has to be performed at the latest in order to prevent a malfunction) may be used to optimize the production plan of the plant. This information, which is available due to the detection of a malfunction according to the disclosure, may thus be included in the automatic optimization of the production plan of the plant.

Basically, according to the embodiment of the disclosure described herein, utilization forecasts of the plant are used for the automatic production planning (which may be supplemented with the predictive maintenance information). Automatic determination of an optimal production plan includes dividing the production plan into individual units and determining an optimal sequence for the units of the production plan. For example, determining the optimal production plan takes into account how long the production time is, how long the make-ready time is, and how long the changeover time is (which includes, for example, product changeover, bottle changeover, and/or packaging changeover). Based on this information, an optimal production plan is automatically created, which minimizes the time it takes to produce all the planned products (each in a certain quantity). An optimal production plan ensures that the line is only idle for as short a time as possible, thus increasing the production volume of the line.

The first step is to optimize the changeover time of the production plan with the aim of minimizing the changes that take the longest. The changeover duration may include the duration of all activities necessary for a changeover, such as a product changeover, bottle changeover, type changeover, format changeover and/or pack changeover. The production plan is broken down into small, contiguous units and these are arranged in such a way that the total changeover time is minimized. Each unit may correspond to at least one product, one processing step or at least one device of a production line for the production of a product of the production plan. Optionally, the maintenance duration determined by the trained machine learning algorithm 60 described above may additionally be taken into account in this regard. In particular, the information about how long maintenance takes and/or the period of time when maintenance has to be performed may be included in the optimization of the changeover time of the production plan. It is, for example, possible to plan the maintenance time of a device so as to coincide with the changeover time of the plant to which this device belongs. In this way, maintenance may be carried out at the same time as the changeover of a product takes place.

In a second step, the optimization of the production costs of the production plan may take place. Based on the first step, the optimization of the changeover time may be extended to include the cost-optimized allocation of the units of the production plan to the individual production lines of the plant. The production plan may be optimized according to the minimum production costs K, which are to be spent for the processing of the units of the production plan. In this case $$K = \sum_{i=1}^{n} H_i * t_{ges,max}$$ (Eq. 1)

where n is the number of lines, $H_i$ is the machine hourly rate of line i in euros per hour, and $t_{ges,max}$ is the maximum production time on a line in hours.

The production time $t_{i,ges}$ for line i is calculated as:

$$t_{i,ges} = t_{Nach,i,ges} + t_{Pro,i,ges}$$ (Eq. 2), where $t_{Nach,i,ges}$ is the retrofitting time of line i in hours and $t_{Pro,i,ges}$ is the production time of line i in hours.

For example, the retrofitting time $t_{Nach,i,ges}$ of line i is calculated as follows:

$$t_{Nach,i,ges} = \text{sume}(M_{1,i}*S_i) + \text{sume}(M_{2,i}*S_i) + \text{sume}(M_{3,i}*S_i)$$ (Eq. 3), where $M_{1,i}$, $M_{2,i}$, $M_{3,i}$ are the retrofitting time matrices for line i (in this example, there are 3 retrofit time matrices; however, more or less than 3 matrices are also possible), $S_i$ is the state change matrix for line i, and sume is the sum over all elements of the matrix.

16

In this example, the production time $t_{Pro,i,ges}$ of line i is calculated as follows:

$$t_{Pro,i,ges} = \text{sum}(t_{Pro,i} * z_{akt,i})$$ (Eq. 4), where $$t_{Pro,i} = \begin{pmatrix} t_{Pro,i,1} \\ t_{Pro,i,2} \\ t_{Pro,i,3} \end{pmatrix}$$

with $t_{Pro,i,j}$ as the production time of a state j for line i in hours (in this example, there are 3 states j=1, 2, 3; however, more or fewer states are also possible; in particular, there may also be different numbers of states for different lines i), $z_{akt,i}$ is a vector with all selected states on line i with $z_{akt,i} = (\text{sum}(S_i, 2) + \text{sum}(S_i, 1)^T)./(\text{sum}(S_i, 2) + \text{sum}(S_i, 1)^T$, and sum indicates the calculation of the sum of the elements of a vector (for example, in a calculation tool such as Matlab).

As mentioned in detail above, information about how long one (or more) device of one of the lines i can continue to operate before a failure associated with a malfunction (predicted by the trained machine learning algorithm 60) occurs may optionally be used at this point. For example, the information that a device may only process a certain number of product units (or may only run for a certain amount of time) before the malfunction occurs may be used as an additional constraint during optimization of the production plan.

The optimization thus results in an assignment of the units (of the production plan) to the individual lines and, in addition, an order in which the units of the production plan are to be processed on the individual lines in order to achieve maximum production efficiency of the entire plant and thus minimum cost. The retrofitting time and the production time may be defined depending on the product and the line, so that the specifications of the line are taken into account when determining the optimized production plan. Finally, an optimal production plan may be determined that minimizes the time it takes to produce all planned products. This enables an optimal layout of the plant.

Figure 7:
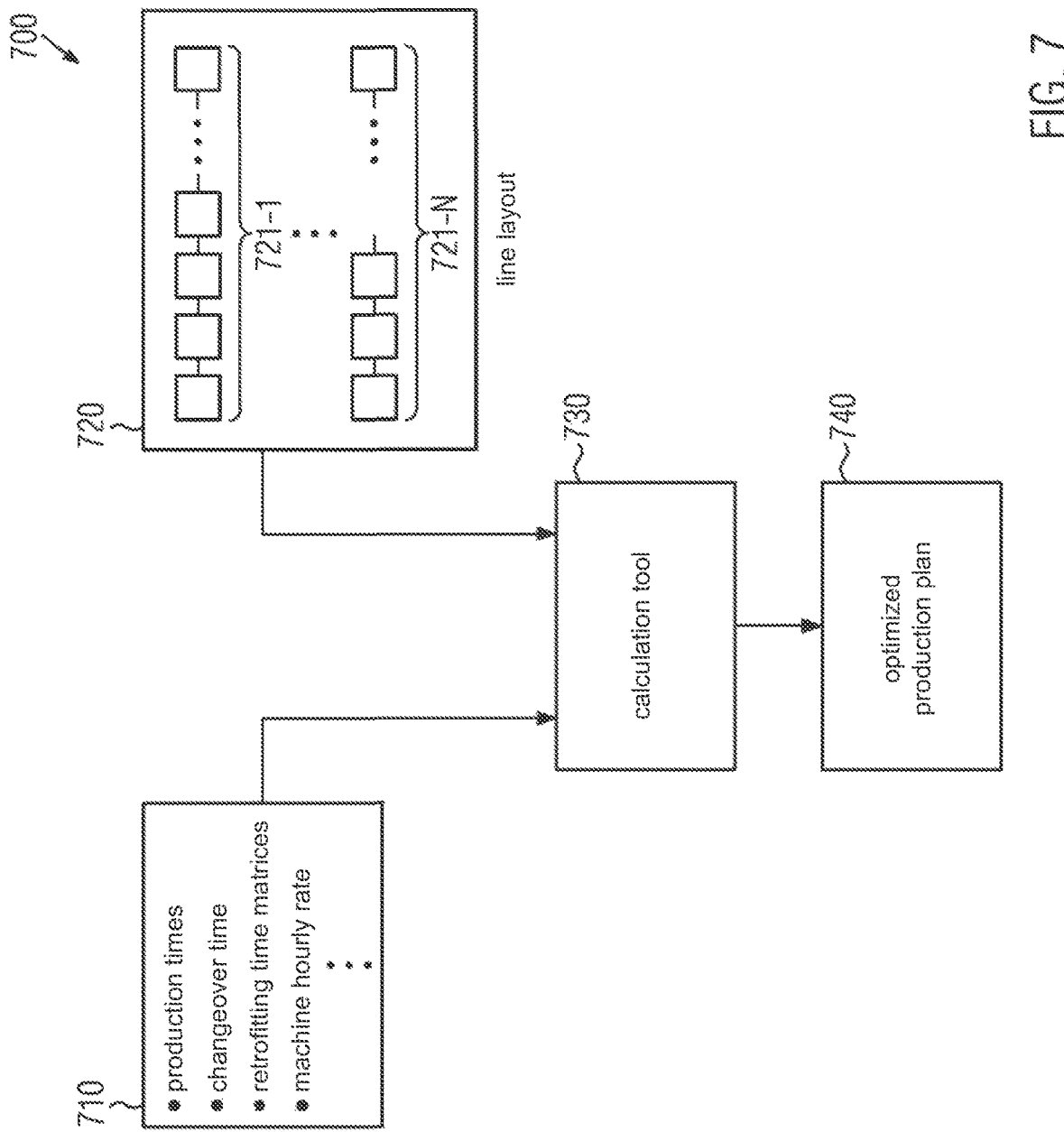
FIG. 7 shows an illustrative system for determining an optimized production plan for the producing one or more products by means of one or more production lines in the food industry or the beverage industry.

This is exemplified in FIG. 7, where the changeover time, the production times $t_{Pro,i,j}$ of each state j of each line i, the retrofitting time matrices $M_{j,i}$, and the machine hour rate $H_i$ are provided as a first input 710, and the line layout of the line is provided as a second input 720 to a calculation tool 730. As described above, the first input 710 may also optionally included the maintenance time determined using the machine learning algorithm 60 trained on simulation data from the digital twin 10B and/or the time until that maintenance task must be performed. The calculation tool 730 then determines, based on the first input 710 and the second input 720, an optimal production plan 740. The optimal production plan includes on which line and in which order the individual units of the production plan should be run so that the production cost K is minimized.

In the optimization process described above, the changeover time as well as the production and retrofitting times for the units (of the production plan) are included. As described above, the information about upcoming maintenance actions (i.e., if and which maintenance action is upcoming for a certain device of the plant, how long this maintenance action will take and/or how much time is left to perform the maintenance action in order to avoid the malfunction) may additionally be included here. According to the present embodiment, it is possible to perform maintenance actions of predictive maintenance on a device of the plant when the plant is at a standstill anyway (e.g., when a changeover is in progress). Thus, it is possible to include the duration of a maintenance action in the optimization of the production plan.

Figure 8:
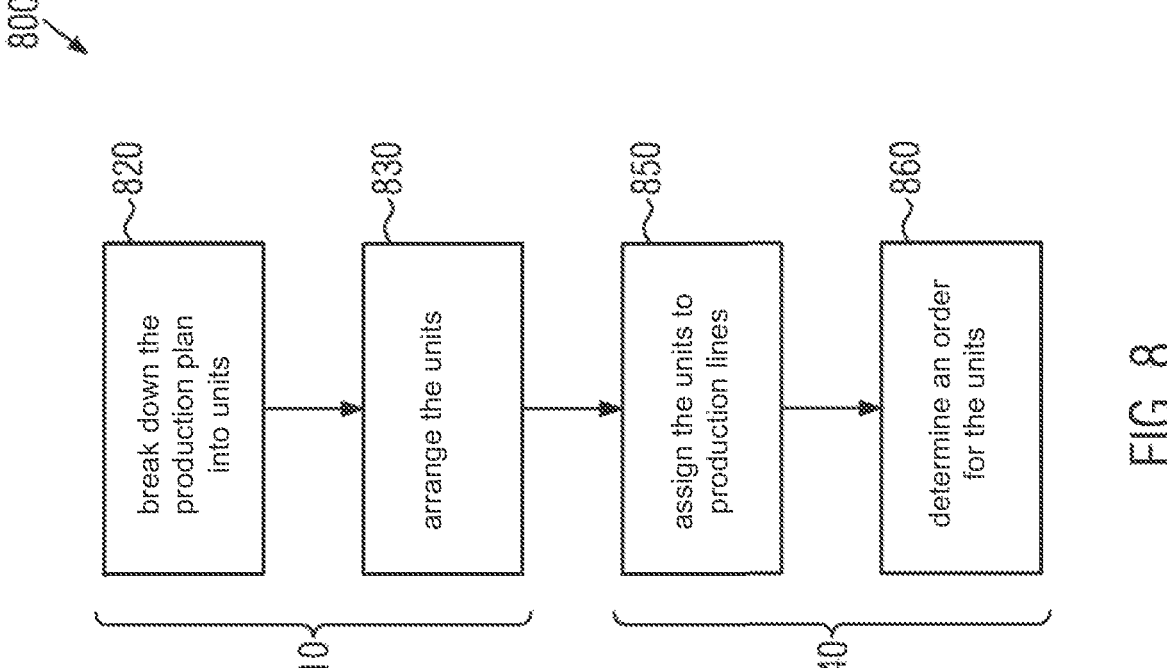
FIG. 8 shows an exemplary method for production plan optimization according to the disclosure.

FIG. 8 shows a method 800 according to one embodiment of the disclosure for determining an optimized production plan 740 for the production of one or more products by means of one or more production lines 721-1 . . . , 721-N in the food industry or the beverage industry. In a first step 810, the changeover time of the production plan is optimized. This first step 810 includes breaking down 820 the production plan into a plurality of contiguous units and arranging 830 the units so that the changeover time has a minimum value. As described above, this first step 810 may additionally be performed based on a duration of a maintenance task for a detected malfunction of a device 10A of a production line of the plurality of production lines 721-1 . . . 721-N.

Subsequently, in a second step 840, the production costs to be spent for processing the units are optimized. This second step 840 comprises assigning 850 the units to a respective production line and determining 860 an order in which the units are to be processed on the production lines. As described above, this second step 840 may additionally be performed based on an expected duration until the predicted incident occurs (determined using the trained machine learning algorithm 60).

It is further noted that features mentioned in the previously described embodiments are not limited to these particular combinations but are also possible in any other combinations as further embodiments.

The invention claimed is:

1. A method for determining an optimized production plan for production of one or more products using one or more production lines in the food industry or the beverage industry, the method comprising:

optimizing a changeover time of the production plan, providing the changeover time of the production plan to a user, and then implementing the changeover time of the production plan, the changeover time comprising a product changeover, bottle changeover, type changeover, format changeover and/or pack changeover in the production of the products, wherein optimizing the changeover time comprises:

breaking down the production plan into a plurality of contiguous units, each of the units corresponding to at least one product, processing step, or at least one device of a production line for producing a product of the production plan; and arranging the units so that the changeover time has a minimum value; and implementing optimized production costs of the production plan to be spent on processing the units, wherein the production costs are determined by retrofitting times and production times for the units, wherein the retrofitting times and production times are defined as product- and device-dependent, and wherein implementing the optimized production costs comprises:

assigning the units to a respective production line, and determining an order in which the units are to be processed by the respective production line and processing the units in the determined order;

wherein the changeover time and/or the production cost additionally comprise a duration of a maintenance action for a detected malfunction of the device of the respective production line.

2. The method of claim 1, wherein the method is further for automatically detecting the malfunction of the device in the food industry or the beverage industry, the method further comprising:

generating simulation data by means of a digital twin of the device, the simulation data being generated for a plurality of malfunctions;

training a machine learning algorithm on the simulation data and the plurality of malfunctions so as to generate a trained machine learning algorithm; and detecting a malfunction of the device by the trained machine learning algorithm using operating data of the device;

wherein the detected malfunction of the device is an event, a failure, and/or a maintenance action to be taken, wherein:

the event comprises increased friction, increased vibration, imbalance, a wear parameter, or decreased lubricity, the failure comprises an engine failure, a bearing failure, an axle failure, a crack, an incorrectly positioned bottle, a short circuit, a stoppage of the device, or any other form of mechanical damage, and the maintenance action to be taken comprises cleaning, lubricating, oiling, fixing, adjusting, replacing, or repairing; and/or wherein detecting the malfunction further comprises detecting a component of the device on which the malfunction occurs.

3. The method of claim 2, wherein detecting the malfunction further comprises detecting the expected time period until the failure occurs from the malfunction.

4. The method according to claim 2, wherein the operating data comprises output signals of the device, wherein the simulation data comprises output signals of the digital twin, and wherein each of the output signals of the digital twin corresponds to a respective output signal of the device; and wherein each of the output signals of the device is measured by a sensor of the device used during operation of the device.

5. The method according to claim 4, wherein the operating data of the device comprises at least one additional output signal of the device, the additional output signal measured by an additional sensor of the device that is not required during operation of the device;

wherein the simulation data comprises at least one corresponding additional output signal of the digital twin; and wherein the additional sensor of the device is selected from a plurality of potential additional sensors by means of the digital twin such that the additional output signal of the additional sensor optimizes detection of the malfunction.

6. The method according to claim 2, wherein the trained machine learning algorithm for detecting the malfunction determines a probability for the malfunction using operating data of the device; and wherein the trained machine learning algorithm recognizes the malfunction when the probability of the malfunction reaches a threshold value.

7. The method according to claim 2, wherein the machine learning algorithm is additionally trained with recorded operating data of the device; and/or wherein the device is a tripod of the food industry.

8. The method according to claim 7, wherein the machine learning algorithm is trained with both the recorded operating data of the device and the simulation data, and wherein the device is a tripod of the food industry.

9. The method according to claim 2, wherein generating the simulation data comprises performing a plurality of simulation runs by the digital twin for each of the plurality of malfunctions.

10. The method according to claim 9, wherein the plurality of simulation runs are subject to stochastic variations.

11. The method according to claim 2, wherein training the machine learning algorithm on the simulation data and the plurality of malfunctions comprises using the plurality of malfunctions and a presence of no malfunction as ground truth.

12. The method according to claim 2, wherein training the machine learning algorithm on the simulation data and the plurality of malfunctions comprises using a predicted time until malfunction as ground truth.

13. A system for determining an optimized production plan for production of one or more products using one or more production lines in the food industry or the beverage industry, the system being configured to:

optimize a changeover time of the production plan, provide the changeover time of the production plan to a user, and then implement the changeover time of the production plan, the changeover time comprising a product changeover, bottle changeover, type changeover, format changeover and/or pack changeover in the production of the products, wherein the system being configured to optimize the changeover time by:

breaking down the production plan into a plurality of contiguous units, each of the units corresponding to at least one product, processing step, or at least one device of a production line for producing a product of the production plan; and arranging the units so that the changeover time has a minimum value; and implementing optimized production costs of the production plan to be spent on processing the units, wherein the production costs are determined by retrofitting times and production times for the units, wherein the retrofitting times and production times are defined as product- and device-dependent, and wherein implementing the optimized production costs comprises:

assigning the units to a respective production line, and determining an order in which the units are to be processed by the respective production line and processing the units in the determined order;

wherein the changeover time and/or the production cost additionally comprise a duration of a maintenance action for a detected malfunction of the device of the respective production line.

14. The system of claim 13, the system being further for automatically detecting the malfunction of the device in the food industry or the beverage industry, the system comprising:

a digital twin of the device, the digital twin configured to:

generate simulation data of the device, the simulation data generated for a plurality of malfunctions of the digital twin; and a machine learning algorithm, the machine learning algorithm trained using the simulation data and the plurality of malfunctions of the digital twin, the machine learning algorithm configured to:

detect a malfunction of the device using operating data of the device; and wherein the machine learning algorithm is executed by one of: a controller of the device, a processor connected to the device, and a cloud;

wherein detecting the malfunction comprises detecting an expected time period until a failure occurs that is caused by the malfunction.

15. The system of claim 14, wherein the detected malfunction of the device is an event, a failure, and/or a maintenance action to be taken, wherein:

the event comprises increased friction, increased vibration, imbalance, a wear parameter, or decreased lubricity, the failure comprises an engine failure, a bearing failure, an axle failure, a crack, an incorrectly positioned bottle, a short circuit, or a stoppage of the device, and the maintenance action to be taken comprises cleaning, lubricating, oiling, fixing, adjusting, replacing, or repairing; and/or wherein detecting the malfunction further comprises detecting a component of the device on which the malfunction occurs.

* * * * *